(12) United States Patent
Svelander

(10) Patent No.: US 9,376,054 B2
(45) Date of Patent: Jun. 28, 2016

(54) LIGHTING DEVICE

(76) Inventor: Lars Svelander, Sörberge (SE)

(*) Notice: Subject to any disclaimer, the term of this patent is extended or adjusted under 35 U.S.C. 154(b) by 550 days.

(21) Appl. No.: 12/527,423

(22) PCT Filed: Sep. 30, 2007

(86) PCT No.: PCT/SE2007/000868
§ 371 (c)(1),
(2), (4) Date: Feb. 19, 2010

(87) PCT Pub. No.: WO2008/100187
PCT Pub. Date: Aug. 21, 2008

(65) Prior Publication Data
US 2010/0177524 A1 Jul. 15, 2010

(30) Foreign Application Priority Data

Feb. 16, 2007 (SE) ...................................... 0700444

(51) Int. Cl.
*B60Q 1/26* (2006.01)
*B60Q 1/06* (2006.01)
*B60Q 1/18* (2006.01)

(52) U.S. Cl.
CPC *B60Q 1/268* (2013.01); *B60Q 1/06* (2013.01); *B60Q 1/18* (2013.01); *B60Q 2900/30* (2013.01)

(58) Field of Classification Search
CPC ............ B60Q 1/268; B60Q 1/18; B60Q 1/06; B60Q 2900/30
USPC ......... 362/494, 487, 503, 504, 4, 11, 18, 464, 362/492, 508, 509, 512, 513
See application file for complete search history.

(56) References Cited

U.S. PATENT DOCUMENTS 5,014,167 A * 5/1991 Roberts .......................... 362/494
6,947,577 B2 * 9/2005 Stam et al. ...................... 382/104

* cited by examiner

*Primary Examiner* — Stephen F Husar
*Assistant Examiner* — Danielle Allen
(74) *Attorney, Agent, or Firm* — Sven W Hanson

(57) ABSTRACT

Lighting device for emission of light through a windshield of a vehicle consisting of at least one lighting unit intended to be temporarily mounted on the inside of a windshield with at least one fastening device. The lighting unit consists of at least one reflector, one lamp and at least one seal between the lighting unit and the windshield. The lighting unit is powered by electric energy and the lamp's on and off switch is controlled by at least one sensor designed to detect turned on high-beams which wirelessly sends control signals to the lighting unit. The lighting device consists of a function with which the light's illumination can be adjusted and with which the light can be completely or partially blocked.

9 Claims, 6 Drawing Sheets

LIGHTING DEVICE

TECHNICAL FIELD

The present invention concerns a lighting device of a type commonly known as driving lights which are intended to be temporarily mounted on the inside of a vehicle's windshield in accordance with the claims.

BACKGROUND OF THE INVENTION

In order to improve lighting on vehicles such as automobiles, trucks, etc, they can be equipped with one or more types of lighting accessories commonly known as driving lights. These driving lights are preferably mounted on the outside front of the vehicle. Alternatively these driving lights can for example be placed on a special mounting frame or on a load carrier, such as a roof rack etc on the roof of a vehicle.

Mounting driving lights on vehicles gives rise to several problems. Firstly, it can be difficult if not impossible to mount driving lights on certain types of vehicles. Even if it is possible to mount driving lights on a vehicle, it may be necessary to make holes in or other alterations to the vehicle. Secondly, existing designs of driving lights can not with ease be moved from one vehicle to another vehicle without having to perform a substantial amount of installation work. There is a clear need for driving lights which can be easily moved from one vehicle to another.

During the last few years traffic safety and environmental concerns have in an ever increasing way begun to affect the conditions under which driving lights can be mounted on vehicles. Externally mounted driving lights are undesirable from a traffic safety standpoint because they add to injuries suffered by unprotected road-users in an accident. Furthermore, externally mounted driving lights affect a vehicle's air resistance negatively (air resistance increases). This results in increased fuel consumption for vehicles which in turn increases pollution. By mounting the driving lights inside a vehicle, no extra pollution is created.

Yet another problem with externally mounted driving lights is that they are susceptible to dirt and grime. When the lamp glass of the driving lights gets dirty, the amount of light emitted from the driving lights is severely limited. Furthermore, a vehicle's externally mounted driving lights are highly susceptible to theft. If driving lights can be placed inside a vehicle, the risk of theft is radically reduced, and if these internally mounted driving lights can in addition be easily removed and taken out of the vehicle, the risk of theft can be further reduced and this at the same time substantially increases usability.

Furthermore, problems can even arise with visibility and a vehicle's preinstalled safety equipment with placement of driving lights on the inside of the windshield. It is very important from both a traffic safety viewpoint and a practical perspective that the driving lights do not block the driver's visibility or impair the function of safety features such as airbags and the like. The purpose of driving lights is to improve safety during the operation of a vehicle and not to reduce safety. Driving lights that are designed to be mounted in proximity to the rearview minor avoid these problems.

Another problem with existing designs of driving lights is that their illumination can not be adjusted. If a different illumination is desired, the driving light must be replaced with another driving light with a different illumination.

It has furthermore come to light that the placement of driving lights has a profound impact on how their efficiency is perceived. By placing driving lights at eye-level or higher, a greatly increased efficiency is achieved because so called umbrae which are tiring to the eyes are minimized.

Lately, lamps such as Xenon HID lamps have been developed. Xenon HID lamps are a very excellent type of lamp which unfortunately have the disadvantage of not operating at full illumination directly after they are switched on. The fact that full illumination is delayed by a second or two can be bothersome to the driver of a vehicle and can in the worst case be detrimental to traffic safety.

PRIOR ART

The placement of lights on the inside of a vehicle's windshield is previously known. Thus patent document U.S. Pat. No. 3,665,392 describes a lighting accessory intended for placement on the inside of a vehicle's windshield. This lighting accessory is mainly intended to be used for communicating with pedestrians and other road-users by the use of light signals. This design differs greatly from the present invention because it among other things is not intended to be used as a driving light that can be temporarily mounted on the inside of a vehicle's windshield. Furthermore the design does not consist of an adjustable reflector and a wireless control signal transmission for switching off and on.

Furthermore, a lighting device intended for placement on the inside of a vehicle's windshield is known from patent document U.S. Pat. No. 6,511,216. This patent document describes a siren device for emergency vehicles which is intended to be permanently mounted on the upper part of the inside of a vehicle's windshield. This design differs greatly from the present invention because it is not intended to be temporarily mounted on the inside of a vehicle's windshield. Furthermore the design does not consist of sensor that senses if the high-beams are off or on.

The Swedish patent SE524241 describes a warning device intended for placement on the windshield of a vehicle. The purpose of this invention is to enable the vehicle's driver to warn people in oncoming vehicles for a traffic hazard that has been observed by the vehicle's driver. Even this design differs greatly from the present invention because it is designed to emit a blinking light. Further, the invention differs from the present invention because it among other things does not consist of a sensor for wireless transmission of information to the lighting unit.

The wireless transmission of control signals from a control unit to a light source is already known via patent document U.S. Pat. No. 5,195,813. This patent document describes a lighting device that is intended to be externally mounted on a vehicle. The purpose of the invention is to reduce the need for cords between a vehicle's interior and a vehicle's engine compartment. The problem in the patent document is solved by wirelessly transmitting control information to the lighting unit. The design differs from the present invention because it is not intended to be temporarily mounted on the inside of a vehicle's windshield, but is essentially intended for permanent attachment. Furthermore the design in accordance with patent document U.S. Pat. No. 5,195,813 does not contain a dimming function by which a lamp such as a Xenon lamp can be left turned on. Furthermore, the design in accordance with patent document U.S. Pat. No. 5,195,813 does not impede theft of the lighting unit to the same extent as the present invention.

BRIEF DESCRIPTION OF THE INVENTION CONCEPT

One purpose of the present invention is to achieve a substantial improvement of the above mentioned problems. This is attained with the aid of a device in accordance with the claim's characterizing parts. Another purpose of the present invention is to achieve a driving light that is easily moved between different vehicles.

DESCRIPTION OF THE INVENTION

The invention will be described in detail in the following text with reference to the enclosed schematic drawings that in an exemplifying purpose show the current preferred embodiments of the invention.

Figure 1:
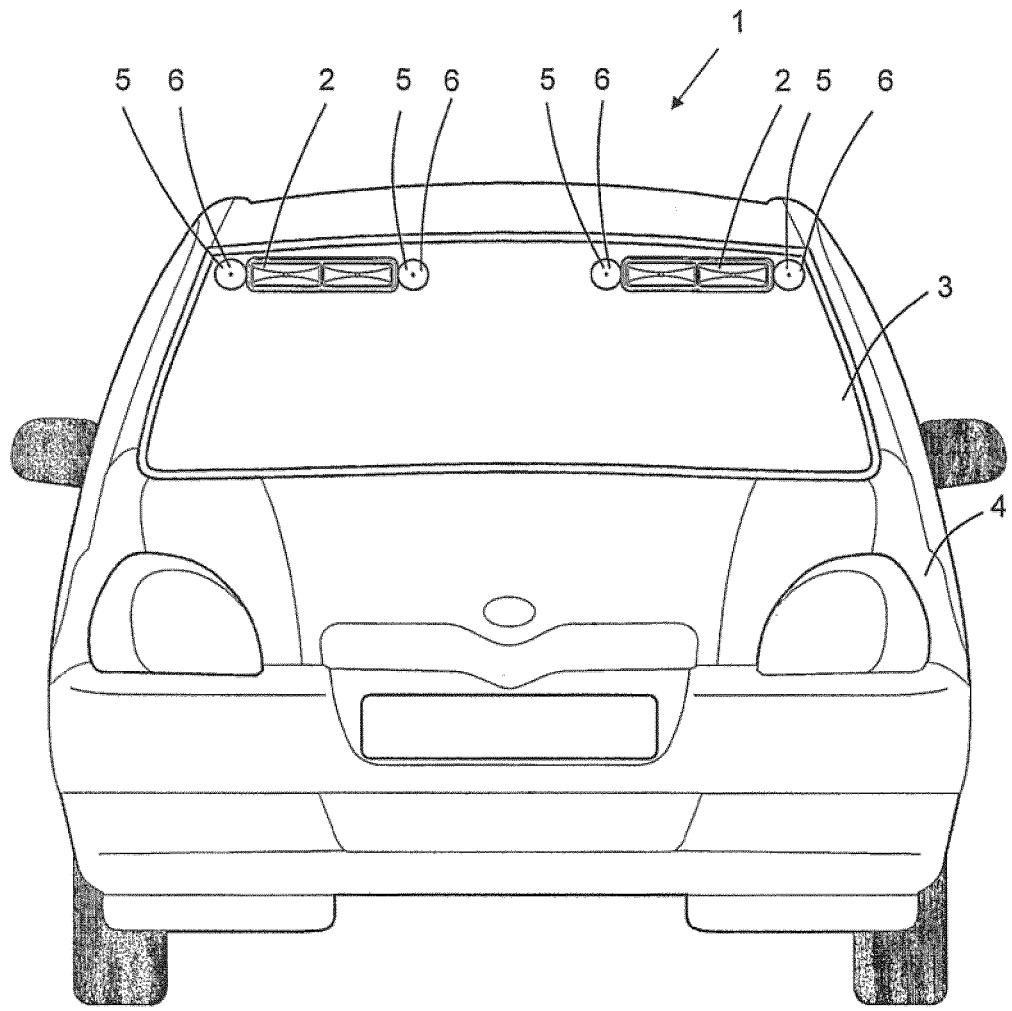
FIG. 1 shows a front-view of a vehicle with the lighting device according to the invention.

With reference to the figures, a lighting device 1 is shown in accordance with the present invention. The lighting device essentially consists of at least one lighting unit 2 which is designed to be temporarily mounted in a vehicle 4 by at least one fastening device 5 on the inside of a windshield 3. The fastening device can preferably be comprised of a design consisting of suction cups 6. Alternatively, a completely different means of attachment that is suitable for the purpose can be used. The suction cups 6 can be connected to a pump, for example a vacuum pump (not shown in the figures) which creates a continuous under-pressure in the suction cups. This continuous under-pressure will keep the lighting unit attached to the windshield. Alternatively, the whole lighting unit can be subjected to under-pressure by a vacuum pump, at which the suction cups can completely or partly be removed.

The placement of lighting units (lighting unit) is not limited to those shown in FIG. 1, and the lighting units (lighting unit) can essentially be mounted anywhere on the inside of the windshield.

In order to stop light from entering the interior of the vehicle from between the lighting unit and the windshield, the lighting unit is equipped with at least one seal 7. The seal is preferably made of a rubber list or the like. Alternatively, the seal can be made of some other type of seal that is suitable for the purpose and keeps the light from escaping out from between the windshield and the lighting unit.

Figure 2:
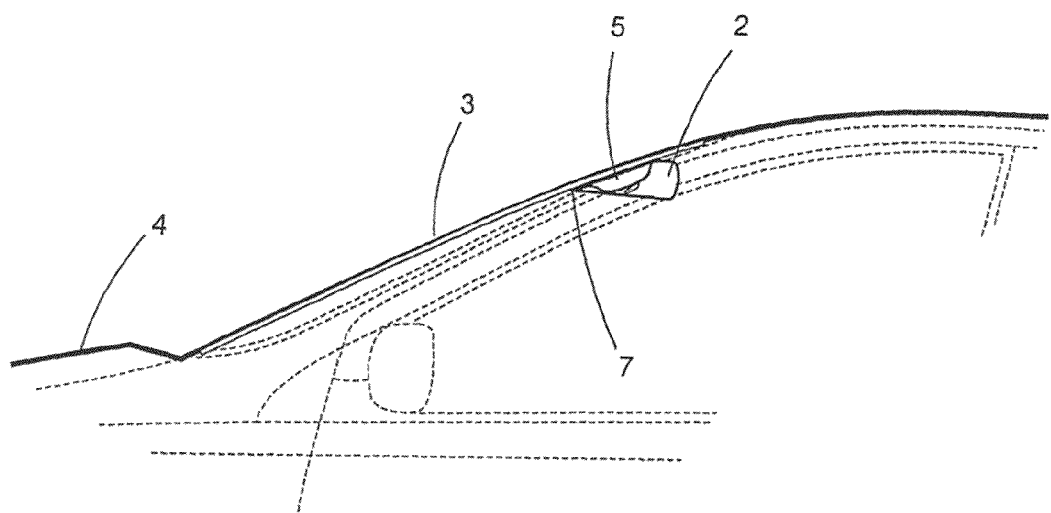
FIG. 2 shows a side-view of a vehicle with the lighting device according to the invention.
Figure 3:
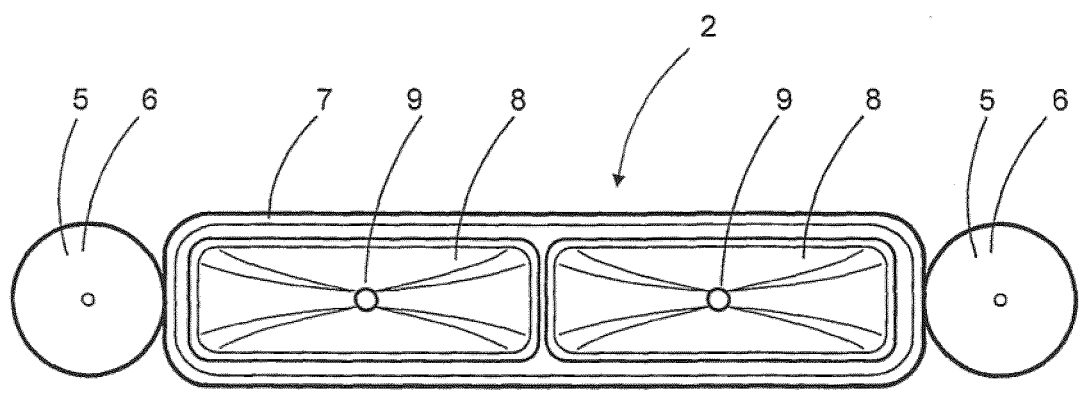
FIG. 3 shows a frontal-view of the lighting device.
Figure 4:
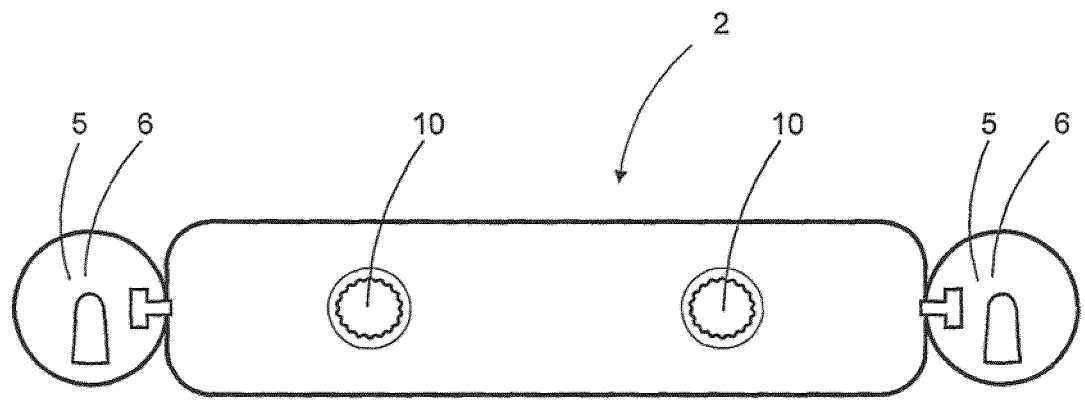
FIG. 4 shows a rear-view of the lighting device.

The lighting unit 4 consists of at least one reflector 8. The reflector consists of at least one lamp holder and at least one lamp 9 and to this the accompanying components for mounting and connecting to electric power. The lamp that emits visible light is preferably a Xenon lamp of HID type. Even other types of lamps can be used, as for example Halogen lamps and LEDs (light emitting diodes). In FIG. 2 a design is shown consisting of two reflectors with rectangular shapes. The shape of the reflectors can alternatively be circular, square or other for the purpose suitable shape. In FIGS. 3 and 4 are shown alternative embodiments of lighting units. Xenon lamps have the advantage of not giving off the same amount of heat that traditional driving light lamps of Halogen type do. A type of lamp such as the Xenon HID and even the LED (light emitting diode) has the advantage of lower energy consumption compared with traditional lamps.

Figure 8:
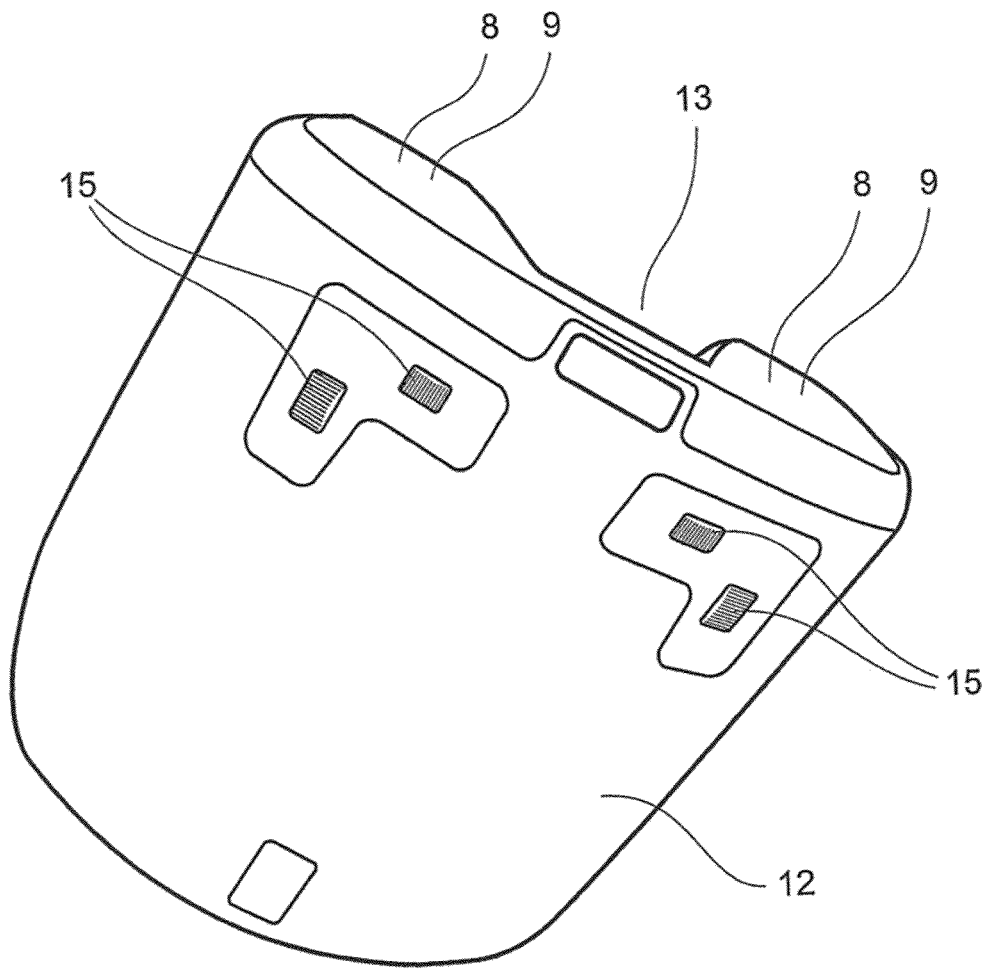
FIG. 8 shows the lighting device diagonally from below according to FIG. 7.

The lighting unit consists of functions with which the emitted light's illumination and direction (position) can be adjusted. Adjustment of the illumination's direction (position) can preferably be accomplished with the aid of adjusting screws that angle the reflector in height as well as sideways. Alternatively, control of the illumination's direction (position) can be accomplished with the aid of electric motors that are designed to adjust the reflectors position in height as well as sideways. FIG. 8 shows a variant where the characteristics and direction of the illumination are controlled with a thumb wheel.

The emitted light's illumination can even be adjusted in width, height and length. The method allows the emitted light's illumination to be changed from full high-beam illumination to distance light illumination and vice versa. The illumination's adjustability is accomplished by at least one added disc which refracts the light in such a way that the desired illumination is achieved. Alternatively, the illumination can be adjusted by changing the reflector's shape. Changing the reflector's shape can be accomplished in several ways and preferably with the aid of adjusting screws. The figures' show a maneuvering unit 10 consisting of a knob for adjusting and modifying the illumination.

The lighting unit is powered by electrical energy feed preferably through at least one cord (not shown in the figures) from at least one outlet (not shown in the figures). One end of the cord is connected to the lighting unit in the usual manner with the aid of previously and generally known and accepted techniques, and therefore this connection is not described further. The cord in its other end is equipped with a contact plug which can preferably be inserted into the vehicle's cigarette lighter. Alternatively, the outlet can be of another type. Alternatively, the lighting unit can be powered by some type of incorporated battery that can emit accumulated energy. It is even conceivable that the lighting unit could hold a unit that generates electric power.

In order to maneuver the on and off switch of the lighting unit, it is equipped with an on and off switch. The on and off switch is controlled with the aid of at least one sensor that sends control signals wirelessly from the sensor to a receiver in the lighting unit. The sensor can preferably be comprised of a sensor that detects (indicates) if the high-beams are on or off. This can be accomplished by the sensor detecting the light from the high-beam lamp on the instrument panel. The sensor can even be designed to detect the specific positions of the switch (lever) for low and high-beams if the switch (lever) has different positions for low and high-beams.

Alternatively, the sensor can be designed to detect measurements of electric energy being conveyed to the switched on high-beams. The wireless transmission of information can preferably be comprised of radio signals, for example Bluetooth, which is a standardized method for the transmission of information between units over short distances. Even other types of radio communication can be utilized. Alternatively, the transmission can be accomplished by signals sent via infra-red light (IR).

The design can even consist of a sensor that detects the light from surrounding vehicles at which the driving light automatically shuts off. Preferably, the light emitted from oncoming traffic and vehicles directly ahead. Alternatively, it is thinkable that radar, IR-sensors or other types of sensors suitable for the purpose can be used to indicate oncoming or nearing vehicles.

The design can even consist of an automatic illumination control that is affected by the turning of the steering wheel. This automatic control means that the illumination moves toward the left during a left turn and in a corresponding way the automatic control results in the illumination turning to the right during a right turn. The position of the steering wheel is detected by a sensor that wirelessly transmits the information (control signals) to the lighting unit. The lighting unit consists of a receiver that receives the signals from the sensor. The receiver sends the signals to a control system that in its turn directs the electric motors to move the reflector.

Xenon lamps such as the Xenon HID lamp are an excellent variety of lamp that however has the disadvantage of not emitting light at full strength directly after it has been switched on. Full-strength illumination can take a few seconds. In order to provide full-strength illumination when the lighting unit is turned on, the lighting unit can be equipped with a shutter (not shown in the figures) of the type used for cameras and the like, which stops the light from being emitted from the lighting unit. Alternatively, some other kind of shutter suitable for the purpose can be used. By using a shutter function the lamp can be turned on at all times thereby eliminating the mentioned problem.

Figure 5:
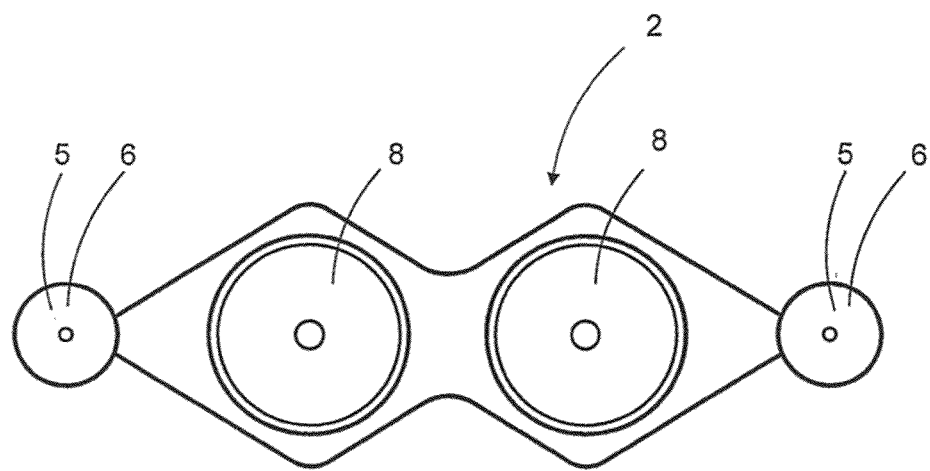
FIG. 5 shows a second embodiment of the lighting device.
Figure 6:
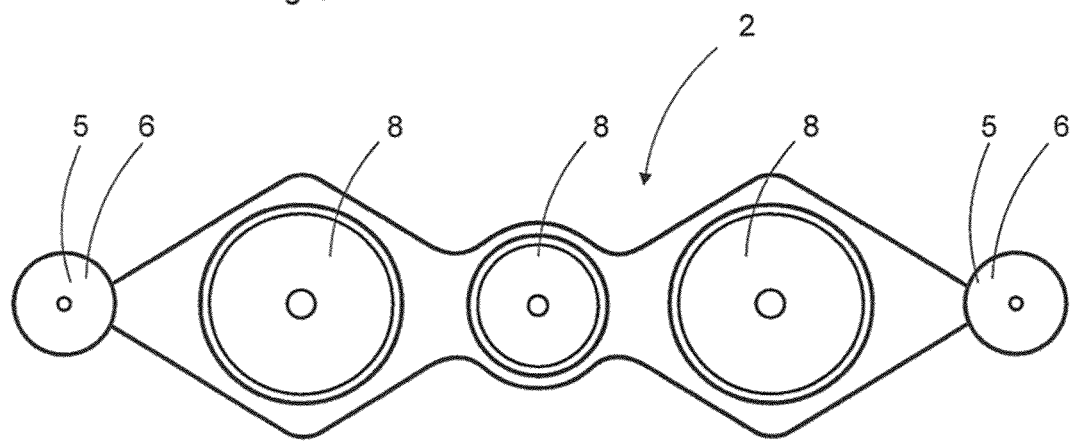
FIG. 6 shows a third embodiment of the lighting device.

In FIGS. 5 and 6 examples of alternative embodiments of the lighting units are shown. The lighting unit in FIG. 5 is equipped with two round reflectors. The lighting unit in FIG. 6 is equipped with two relatively larger round reflectors with a relatively smaller intermediate round reflector.

Figure 7:
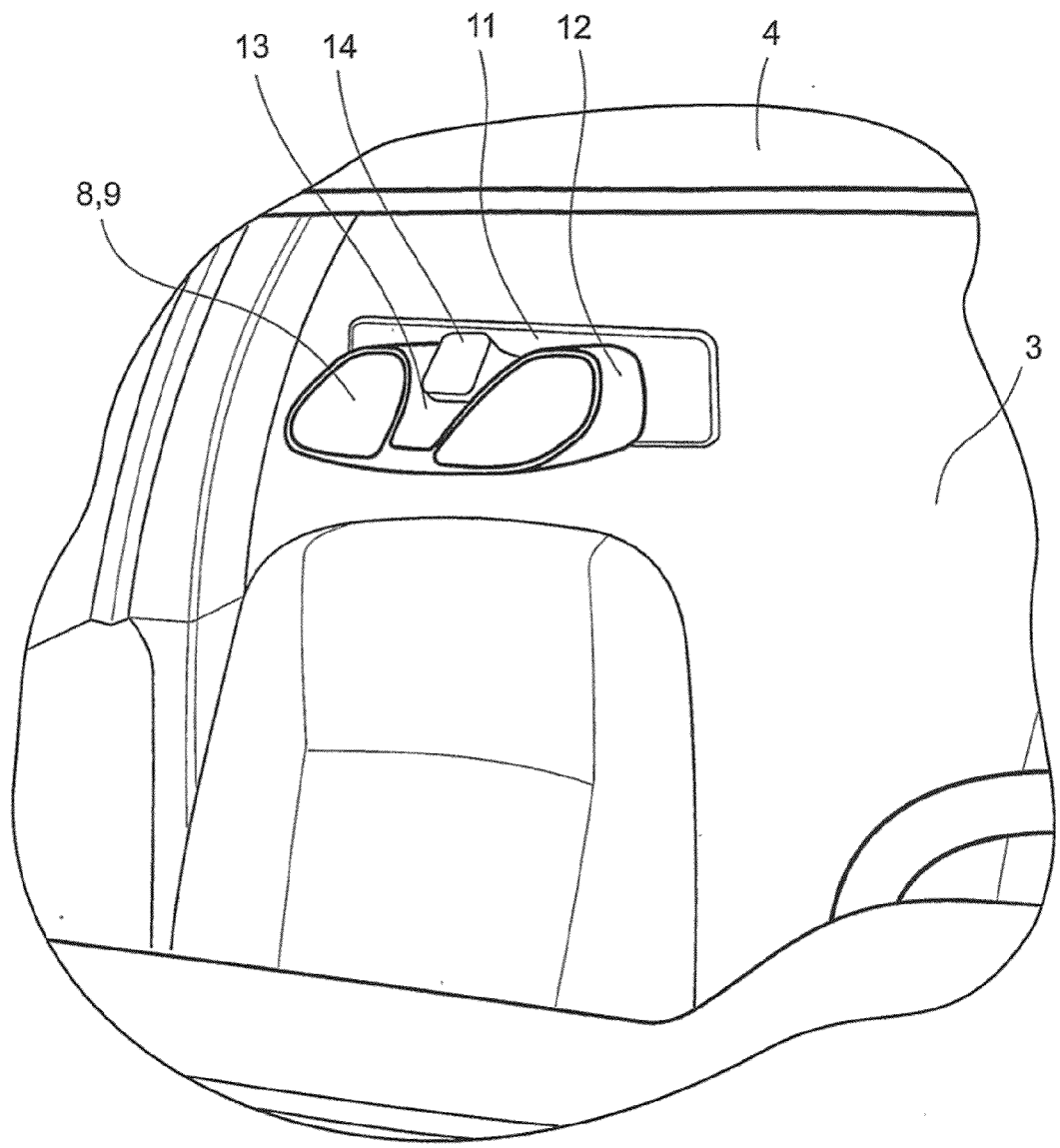
FIG. 7 shows a lighting device which has been integrated with an inner rear-view mirror.

In FIGS. 7 and 8 an alternative embodiment of the lighting device 1 is shown mounted on the inside of a windshield 3, which is designed to be integrated with or placed in direct proximity to the rear-view mirror 11. The lighting device 1 consists of a lighting unit 2 which consists of at least two reflectors 8 and at least two lamps 9. The lighting unit's 2 casing 12 consists of at least one recess 13 or the like that allows the lighting unit to completely or partially encompass the rear-view mirror's 11 fastener 14. The characteristics and the direction of the illumination are controlled by the thumb screw 15. In variations of the lighting unit 1 it is thinkable that the rear-view minor is directly mounted on the lighting unit 2 without a fastener 14. The fastening device 5 in this embodiment is preferably comprised of a double-sided tape or other for the purpose suitable attachment device. Because the lighting unit 2 completely or partially encompasses the rear-view minor's 11 fastener 14, blockage of the driver's line of sight (visibility) by the lighting device is minimized.

These embodiments of the present invention have been developed to avoid any possible problems with visibility and also the vehicle's preinstalled safety equipment (airbags and the like) which in certain vehicle types are found in close proximity to the windshield, as well as any displays designed to show information on the windshield. The figure shows clearly that the invention's impact on traffic safety (driver visibility), safety equipment and possible information displays is negligible. The purpose of the invention is to improve traffic flow and traffic safety when vehicles are used in traffic and not to reduce safety for the driver, the passengers, other vehicles or pedestrians.

Several advantages are achieved thanks to the invention. For instance the driving light can easily be moved from one vehicle to another. Furthermore the invention makes it possible to mount driving lights on vehicle models where earlier it was difficult if not impossible to mount driving lights. Another advantage with the invention is that it reduces the risk of the driving light theft. Further, the driving light is to a minimal extent exposed to dirt and grime which has the positive effect that the emitted light from the lighting unit is essentially not reduced. The present invention also achieves the advantage of the driving light being placed high up as well as being able to adjust the illumination without having to remove the driving light. Further, the environmental disadvantages mentioned earlier are eliminated and even the traffic safety disadvantages with externally mounted driving lights are eliminated.

Even if certain preferred embodiments have been described in detail, variations and modifications can within the scope of the invention become evident for specialists in the field and all such are regarded as falling within the scope of the following claims

The invention claimed is:

1. A lighting device for the emission of light for the purpose of illumination through a windshield of a vehicle having high-beam lights comprising;
    at least one lighting unit, powered by electricity, and configured to be placed level in height with the driver's eyes or higher, on the inside of a vehicle's windshield with at least one fastening device;
    said lighting unit comprising at least one reflector, at least one lamp and at least one seal, the seal configured to be located between the lighting unit and the windshield such as to prevent light from passing between the lighting unit and windshield and into the vehicle;
    said lighting unit also including at least one on and off switch and at least one sensor designed to detect the operation of the vehicle's high-beam lights;
    said lighting unit further comprising at least one adjustment device by which the emitted light's illumination is designed to be manually adjustable.

2. A lighting device according to claim 1 and wherein the lighting unit's illumination is designed to be non-incrementally adjustable by means of the reflector's shape being influenced to change by at least one adjusting screw.

3. A lighting device according to claim 1 and wherein the lighting unit's illumination is designed to be non-incrementally adjustable by means of the reflector's position being influenced to change by at least one adjusting screw.

4. A lighting device according to claim 1 and wherein the lighting unit's illumination is designed to be adjustable with at least one replaceable accessory disc between the windshield and the lamp.

5. A lighting device according to claim 1 and wherein the lighting unit is designed to be temporarily attached to the inside of a vehicle's windshield.

6. A lighting device according to claim 1 and wherein the lighting unit includes a recess that allows the lighting unit to partially encompass the vehicle's rear-view mirror's fastener.

7. A lighting device according to claim 1 and wherein the lighting unit includes a recess that allows the lighting unit to completely encompass the vehicle's rear-view mirror's fastener.

8. A lighting device according to claim 1 and wherein the lighting device also comprises an integrated rear-view mirror.

9. A lighting device according to claim 1 and wherein the lighting unit includes a shutter function designed to completely or partially block out the emission of light from the lighting unit.

* * * * *